(12) United States Patent
Lee et al.

(10) Patent No.: US 8,858,174 B2
(45) Date of Patent: Oct. 14, 2014

(54) WIND TURBINE TORQUE-SPEED CONTROL

(75) Inventors: Dongjai Lee, Greer, SC (US); Stefan Herr, Greenville, SC (US); Klaus Ulrich Koegler, Rheine (DE)

(73) Assignee: General Electric Company, Schenectady, NY (US)

( * ) Notice: Subject to any disclaimer, the term of this patent is extended or adjusted under 35 U.S.C. 154(b) by 643 days.

(21) Appl. No.: 13/106,007

(22) Filed: May 12, 2011

(65) Prior Publication Data
US 2012/0027587 A1 Feb. 2, 2012

(51) Int. Cl.
F03D 7/00 (2006.01)
F03D 7/02 (2006.01)

(52) U.S. Cl.
CPC ............. *F03D 7/0224* (2013.01); *Y02E 10/723* (2013.01); *F05B 2270/327* (2013.01); *F05B 2270/335* (2013.01); *F05B 2270/328* (2013.01); *F05B 2270/101* (2013.01); *F05B 2270/32* (2013.01)
USPC ................................................ 416/1; 416/61

(58) Field of Classification Search
USPC ........................................................ 416/1, 61
See application file for complete search history.

(56) References Cited

U.S. PATENT DOCUMENTS

| | | | |
|---|---|---|---|
| 4,703,189 A | 10/1987 | DiValentin et al. | |
| 5,155,375 A | 10/1992 | Holly | |
| 5,798,631 A | 8/1998 | Spee et al. | |
| 7,261,672 B2 | 8/2007 | Frank et al. | |
| 7,504,738 B2 | 3/2009 | Barton et al. | |
| 7,586,206 B2 | 9/2009 | Barton et al. | |
| 7,602,075 B2 | 10/2009 | Erdman et al. | |
| 7,704,043 B2 | 4/2010 | Kabatzke et al. | |
| 2007/0085343 A1* | 4/2007 | Fortmann | 290/44 |
| 2008/0069693 A1* | 3/2008 | Malakhova et al. | 416/61 |
| 2009/0220340 A1 | 9/2009 | Pierce et al. | |
| 2009/0295159 A1 | 12/2009 | Johnson et al. | |
| 2010/0098540 A1 | 4/2010 | Fric et al. | |

OTHER PUBLICATIONS

Pao et al., "A Tutorial on the Dynamics and Control of Wind Turbines and Wind Farms", Jun. 12, 2009, American Control Conference, p. 2082.*
Wind turbine aerodynamics, Wikipedia, http://en.wikipedia/wiki/Wind_turbine_aerodynamics.
"Wind Turbine Power Calculations", The Royal Academy of Engineering, pp. 1-5.
"Understanding Coefficient of Power (Cp) and Betz Limit" Kidwind Science Snack: Betz Limit.

* cited by examiner

*Primary Examiner* — Edward Look
*Assistant Examiner* — Danielle M Christensen
(74) *Attorney, Agent, or Firm* — Dority & Manning, P.A.

(57) ABSTRACT

The present subject matter relates to methods and systems for operating a wind turbine that, in some embodiments may include a gearbox. The wind turbine is provided with a blade having an adjustable pitch angle and the tip speed ratio (TSR) of the blade is monitored. In operation, the method and system is configured to increase the pitch angle of the blade concurrently with an increase in TSR to maintain turbine operation within an identified high power coefficient (Cp) operational region for the blade. TSR may be monitored by monitoring one of the velocity of the tip of the blade, wind speed, the rotational speed of the blade, or the rotational speed of a component within the gearbox.

14 Claims, 3 Drawing Sheets

WIND TURBINE TORQUE-SPEED CONTROL

FIELD OF THE INVENTION

The present subject matter is directed generally to wind turbines, and more particularly to a method for torque-speed control of a wind turbine.

BACKGROUND OF THE INVENTION

Wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines that are designed to provide electrical power to a utility grid can have large rotors (e.g., 30 or more meters in length). In addition, wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbine blades have continually increased in size in order to increase energy capture. However, as blades have increased in size, it has become increasingly more difficult to control optimum energy capture. The blade loading is dependent on the wind speed, tip speed ratio (TSR) and/or pitch setting of the blade. TSR, as is understood by those of ordinary skill in the art, is the ratio of the rotational velocity of the blade tip to the actual wind speed. Generally, it is important to optimize the operation of the wind turbine, including blade energy capture, to reduce the cost of the energy produced. Pitch setting of the blades (i.e., the angle of attack of the airfoil shaped blade), provides one of the parameters utilized in wind turbine control. Typically, controllers are configured to adjust the rotational speed of the hub around which the blades rotate, i.e., the rotational speed, by adjusting the blade pitch in a manner that provides increased or decreased energy transfer from the wind, which accordingly is expected to adjust the rotor speed.

The amount of energy that can be extracted from wind is based on a number of factors including the swept area covered by the rotating blades. This, of course, is directly dependent on the length of the blades so that increases in extracted energy are dependent, for individual turbines, at least in part, on providing longer blades.

One issue arising from continually increasing turbine size, however, is the need to increase the torque handling capacity of the gearboxes. It would be advantages, however, to keep the generator torque low so that gearbox torque ratings, and consequently size and cost, may also be kept low.

Therefore, what is needed is a method for operating a wind turbine to permit operation in a high power coefficient (Cp) operating region for longer periods to permit control of the generator torque limit.

BRIEF DESCRIPTION OF THE INVENTION

Aspects and advantages of the invention will be set forth in part in the following description, or may be obvious from the description, or may be learned through practice of the invention.

The present subject matter relates to a method for operating a wind turbine including providing a wind turbine having a blade with an adjustable pitch angle and monitoring the tip speed ratio (TSR) of the blade. This method also identifies a high power coefficient (Cp) operational region for the blade and increases the pitch angle of the blade concurrently with an increase in TSR to maintain turbine operation within the identified Cp region. In selected methods, monitoring TSR may be performed by monitoring one of the velocity of the tip of the blade, wind speed or the rotational speed of the blade.

The present subject matter also relates to a method for limiting torque in a gearbox associated with a wind operated turbine. In these methods, a wind turbine is provided that has a blade having an adjustable pitch angle. A gearbox is coupled to the wind turbine and the tip speed ratio (TSR) of the blade is monitored. According to such method, a high power coefficient (Cp) operational region for the blade is identified and the pitch angle of the blade is increased concurrently with an increase in TSR to maintain turbine operation within the identified Cp region.

In selected such methods, monitoring TSR comprises monitoring one of the velocity of the tip of the blade, wind speed, or the rotational speed of the blade. In other embodiments, monitoring TSR comprises monitoring the rotational speed of a rotating component of the gearbox.

The present subject matter also relates to a system for controlling operation of a wind turbine. In such systems a wind turbine having a blade having an adjustable pitch angle is provided along with a sensor configured to monitor the tip speed ratio (TSR) of the blade. A controller associated with the wind turbine is configured to cause the pitch angle of the blade to increase concurrently with an increase in TSR to maintain turbine operation within a high power coefficient (Cp) operational region for the blade. In these embodiments of the present subject matter, TSR may be monitored by monitoring any one of the velocity of the tip of the blade, wind speed, or the rotational speed of the blade. In selected further embodiments, the system may also include a gearbox coupled to the wind turbine. In such embodiments, TSR may be monitored by monitoring the rotational speed of a gearbox component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
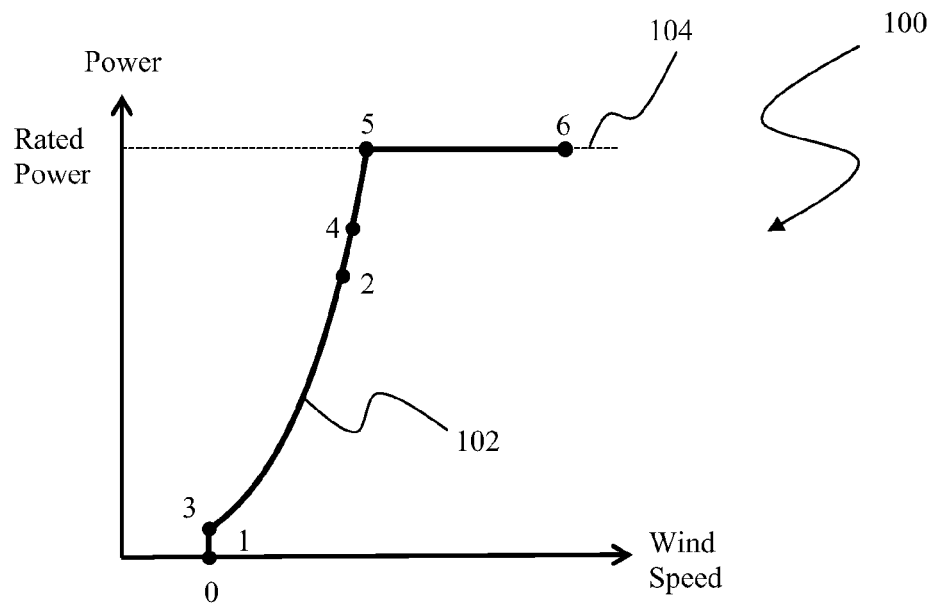
FIG. 1 provides an illustration of a typical operating power curve for a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Reference will now be made in detail to the presently preferred embodiments of the subject wind turbine torque-speed control method and system. Referring now to the drawings, FIG. 1 illustrates a typical operating power curve 100 for a wind turbine. As is generally understood and illustrated in FIG. 1, a wind turbine may operate along an operating line 102 from a point "1" where wind speed is zero through point "2" to reach a rated power level 104 at point "5." After reaching the rated power level 104, addition wind speed does not result in additional turbine power output.

Figure 2:
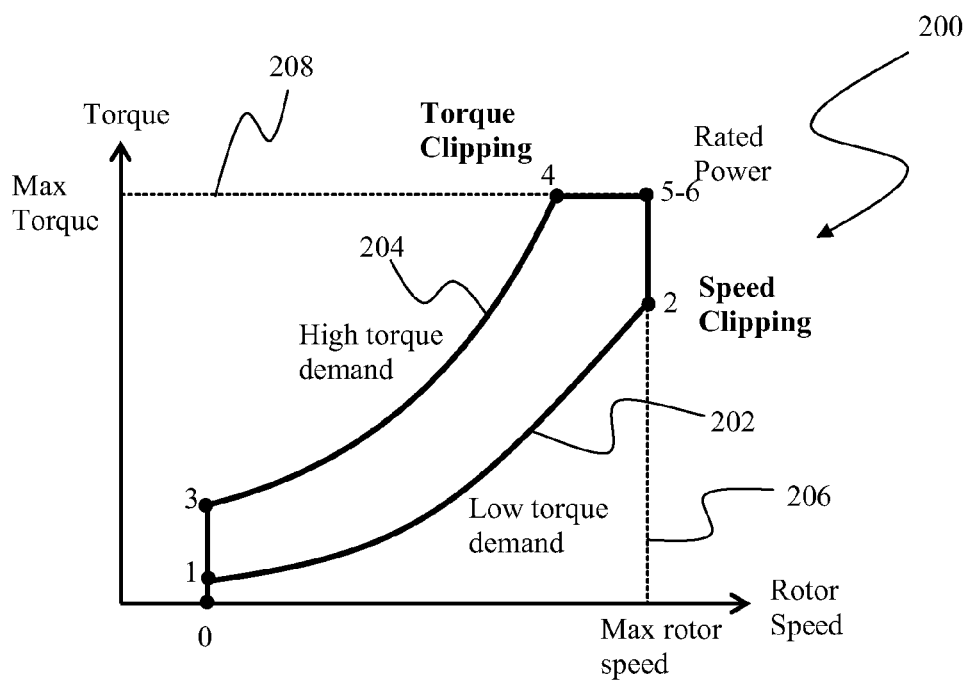
FIG. 2 illustrates torque-speed curves illustrating differing operating curves between low torque demand and high torque demand.

Similarly, a relationship exists between rotor speed and torque as illustrated by torque-speed curve 200 illustrated in FIG. 2. Torque-speed curve 200 illustrates differing operating curves resulting from differing blade designs where curve 202 extending along points 1-2-5-6 represents a low torque demand design while curve 204 extending along points 1-3-4-5-6 represents a high torque demand design. As will be noticed, the low torque demand curve 202 will reach a maximum rotor speed 206 at point "2" where speed clipping will be observed prior to such turbine reaching its rated power at point "6." The high torque demand curve 204, on the other hand, will reach its maximum torque at point "4" and thus experience torque clipping prior to reaching its rated power at point "5." The present subject matter is generally concerned with operation in this latter instances along curve 204 where the wind turbine reaches maximum torque limit first below rated power and aims to achieve improved overall performance even with lower generator torque.

Figure 3:
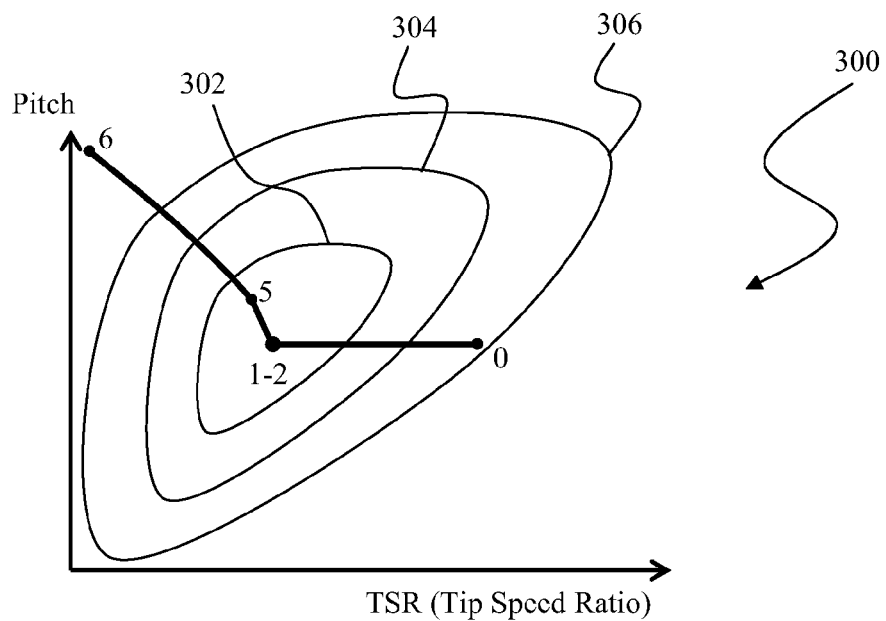
FIG. 3 is a power coefficient (Cp) map resulting from a turbine operating with speed clipping.
Figure 4:
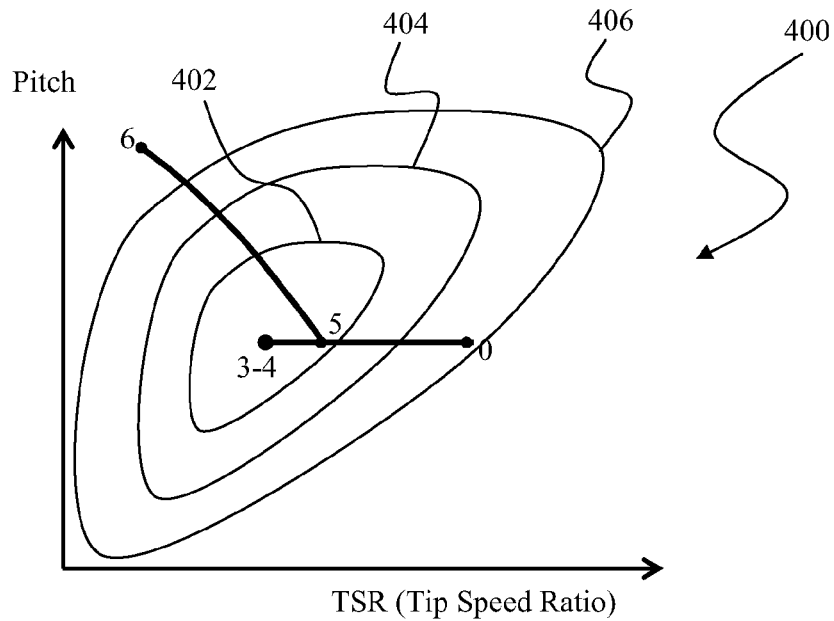
FIG. 4 is a power coefficient (Cp) map resulting from a turbine operating with torque clipping.

Referring now to FIGS. 3 and 4, there are illustrated a pair of power coefficient (Cp) maps 300, 400 illustrating various power coefficient versus tip speed ratio (TSR) vs. pitch angle where the map of FIG. 3 results from a turbine operating with speed clipping while that of FIG. 4 results from a turbine operating with torque clipping.

Generally various Cp levels are represented in FIGS. 3 and 4 by contour lines 302, 304, 306, 402, 404, 406 where contour lines 302, 402 represent higher Cp levels and lines 304, 404 and then lines 306. 406 represent progressively lower Cp levels. As will be appreciated by those of ordinary skill in the art, the various contour lines 302, 304, 306, 402, 404, 406 depend on the specific design of the turbine blades. Further, it is generally preferred to operate the turbine at the highest Cp point represented at points 1-2-5 in FIGS. 3 and 3-4 in FIG. 4 if possible.

It will be recalled that FIG. 3 is representative of a turbine system operating with speed clipping. Referring briefly back to FIG. 2, speed clipping occurs when the maximum rotor speed 206 is reached prior to reaching rated power. In this case, as more generally illustrated in FIG. 3, to reach rated power, pitch angle may be increased, but generally this will result in a lower TSR.

In the case of operation where torque clipping occurs as illustrated in FIG. 4, maximum Cp at points 3-4 still requires an increase in rotor speed to reach rated power but further increase in pitch angle toward point "6" relatively quickly can produce operation outside the higher Cp region 402.

Figure 5:
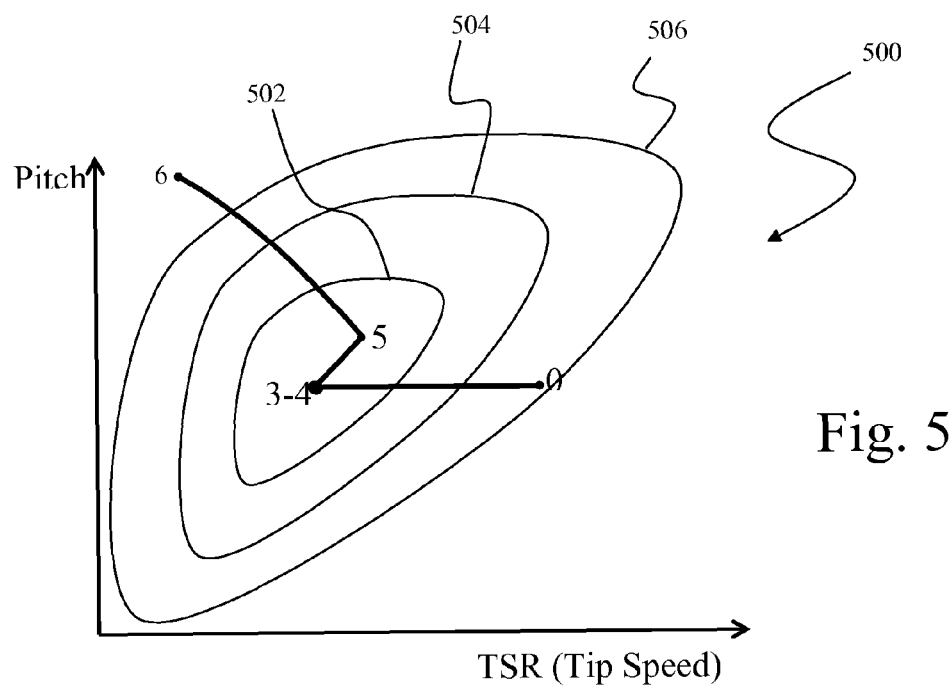
FIG. 5 is a power coefficient (Cp) map resulting from a turbine operating in accordance with present technology wherein pitch is controlled to maintain operation in a high Cp region as tip speed increases.

Referring now to FIG. 5, there is illustrated a power coefficient (Cp) map 500 resulting from a turbine operating in accordance with present technology. Contour lines 506, 504, 502 represent increasingly higher power coefficients and, in accordance with present technology, pitch angle is controlled to maintain operation in the relatively higher Cp region 502, although not necessarily at the peak Cp points 3-4, as tip speed ratio changes. By controlling the pitch angle while the tip speed ratio increases between points 3-4 to point 5, torque is limited and the turbine is able to be operated for a longer period of time within higher Cp region 502 before further increases in pitch angle toward point "6" causes operation to move toward lower Cp regions illustrated by contour lines 504 and 506.

In accordance with the present subject matter, TSR may be actively monitored in a number of ways and used as a parameter to adjust pitch angle. As previously mentioned, TSR corresponds to the ratio of blade tip velocity to actual wind speed. Also, of course, blade tip velocity is a function of blade length and rotational speed. TSR then may be monitored by direct measurement of any one of actual tip velocity, blade rotational speed, or wind speed for any given length blade. TSR may also be monitored indirectly when a gearbox is coupled to the turbine by monitoring the rotational speed of an output of the gearbox or of any gears within the gearbox.

By increasing the pitch angle concurrently with increasing TSR, a number of advantages are realized. Principally since this operation limits torque, lower rated gearboxes may be used thereby decreasing costs and equipment size. In this manner the size of the gearbox becomes smaller than would have been otherwise appropriate absent the presently disclosed operating methodology. Additionally, annual energy production (AEP) is improved and wind produced thrust tending to topple the turbine is lowered. Through use of the present subject matter as wind turbine blades become longer for the same power ratings, there is less need to upgrade the gearbox to increase the torque limit.

Figure 6:
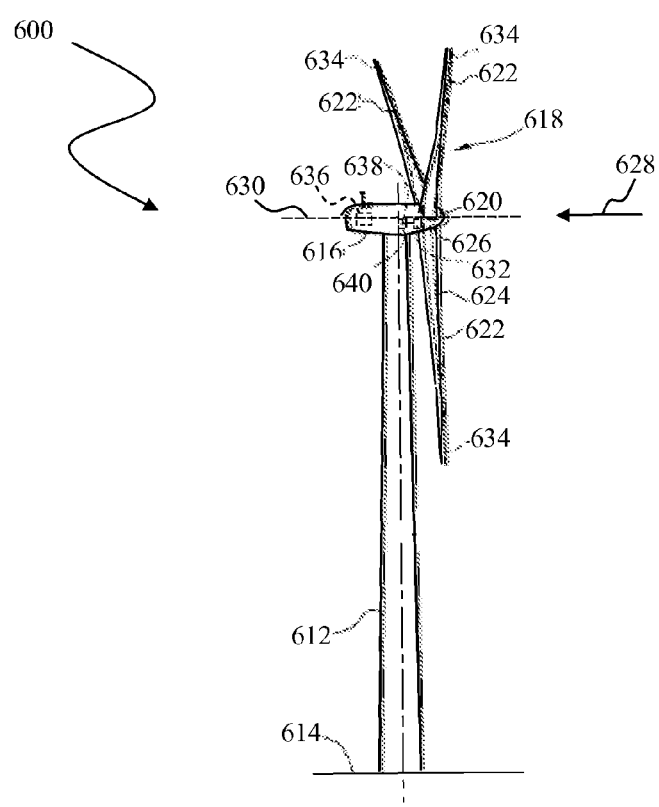
FIG. 6 is a perspective view of an exemplary wind turbine that may incorporate aspects of the invention.

FIG. 6 is a perspective view of an exemplary wind turbine 600 with which the present subject matter may be employed. In this exemplary embodiment, wind turbine 600 is a horizontal-axis wind turbine. Alternatively, wind turbine 600 may be a vertical-axis wind turbine. In the exemplary embodiment, wind turbine 600 includes a tower 612 that extends from a support system 614, a nacelle 616 mounted on tower 612, and a rotor 618 that is coupled to nacelle 616. Rotor 618 includes a rotatable hub 620 and at least one rotor blade 622 coupled to and extending outward from hub 620. In the exemplary embodiment, rotor 618 has three rotor blades 622. In an alternative embodiment, rotor 618 includes more or less than three rotor blades 622. In the exemplary embodiment, tower 612 is fabricated from tubular steel to define a cavity (not shown in FIG. 6) between support system 614 and nacelle 616. In an alternative embodiment, tower 612 is any suitable type of tower having any suitable height.

Rotor blades 622 are spaced about hub 620 to facilitate rotating rotor 618 to enable kinetic energy to be transferred from the wind into usable mechanical energy, and subsequently, electrical energy. More specifically, the rotor blades 622 transform wind energy into a rotational torque or force that drives a gearbox 636 that is typically housed within the nacelle 616. As such, the gearbox 636 can step up the inherently low rotational speed of the turbine rotor for the generator (not shown) to efficiently convert mechanical energy to electrical energy, which is fed into a utility grid. Rotor blades 622 are mated to hub 620 by coupling a blade root portion 624 to hub 620 at a plurality of load transfer regions 626. Load transfer regions 626 have a hub load transfer region and a blade load transfer region (both not shown in FIG. 6). Loads induced to rotor blades 622 are transferred to hub 620 via load transfer regions 626.

As wind strikes rotor blades 622 from a direction 628, rotor 618 is rotated about an axis of rotation 630. As rotor blades 622 are rotated and subjected to centrifugal forces, rotor blades 622 are also subjected to various threes and moments, As such, rotor blades 622 may deflect and/or rotate from a neutral, or non-deflected, position to a deflected position. Moreover, a pitch angle or blade pitch of rotor blades 622, i.e., an angle that determines a perspective of rotor blades 622 with respect to direction 628 of the wind, may be changed by a pitch adjustment system 632 to control the load and power generated by wind turbine 600 by adjusting an angular position, of at least one rotor blade 622 relative to wind vectors as previously described herein above. More specifically, the wind turbine 600 may include a controller 640 configured to control the pitch adjustment system 632. In addition, the wind turbine 600 may include a sensor 638 configured to monitor the tip speed ratio (TSR) of one or more of the rotor blade 622. Pitch axes 634 for rotor blades 622 are shown. During operation of wind turbine 600, the controller 640 may control the pitch adjustment system 632 to change a blade pitch of rotor blades 622. As such, the controller 640 is configured to cause the pitch angle of one or more of the rotor blades 622 to increase concurrently with an increase in TSR to maintain turbine operation within a high power coefficient (Cp) operational region for the one or more blades 622.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, comprising:
   providing a wind turbine having at least one blade having an adjustable pitch angle;
   monitoring the tip speed ratio (TSR) of the at least one blade;
   identifying a high power coefficient ($C_p$) operational region for the at least one blade;
   performing the following steps in sequential order to maximize an amount of time turbine operation is within the identified $C_p$ region:
      increasing the pitch angle of the at least one blade concurrently with an increase in TSR to maintain turbine operation within the identified $C_p$ region, wherein concurrently increasing the pitch angle of the at least one blade with the TSR reduces a generator torque of the wind turbine; and,
      increasing the pitch angle of the at least one blade concurrently with a decrease in TSR so as to limit a power output of the wind turbine to a rated power for the wind turbine.

2. A method as in claim 1, wherein monitoring TSR comprises monitoring the velocity of the tip of the at least one blade.

3. A method as in claim 1, wherein monitoring TSR comprises monitoring wind speed.

4. A method as in claim 1, wherein monitoring TSR comprises monitoring the rotational speed of the at least one blade.

5. A method for limiting torque in a gearbox associated with a wind operated turbine, comprising:
   providing a wind turbine having at least one blade having an adjustable pitch angle;
   coupling a gearbox to the wind turbine;
   monitoring the tip speed ratio (TSR) of the at least one blade;
   identifying a high power coefficient (Cp) operational region for the at least one blade; and,
   performing the following steps in sequential order to maximize an amount of time turbine operation is within the identified $C_p$ region:
      increasing the pitch angle of the at least one blade concurrently with an increase in TSR to maintain turbine operation within the identified Cp region, wherein concurrently increasing the pitch angle of the at least one blade with the TSR reduces a generator torque of the wind turbine and,
      increasing the pitch angle of the at least one blade concurrently with a decrease in TSR so as to limit a power output of the wind turbine to a rated power for the wind turbine.

6. A method as in claim 5, wherein monitoring TSR comprises monitoring the velocity of the tip of the at least one blade.

7. A method as in claim 5, wherein monitoring TSR comprises monitoring wind speed.

8. A method as in claim 5, wherein monitoring TSR comprises monitoring the rotational speed of the at least one blade.

9. A method as in claim 5, wherein monitoring TSR comprises monitoring the rotational speed of a rotating component of the gearbox.

10. A system for controlling operation of a wind turbine, comprising:
   a wind turbine having at least one blade having an adjustable pitch angle;
   a sensor configured to monitor the tip speed ratio (TSR) of said at least one blade; and,
   a controller configured to perform the following steps in sequential order to maximize an amount of time turbine operation is within the identified $C_p$ region:
      increase the pitch angle of the at least one blade concurrently with an increase in TSR to maintain turbine operation within a high power coefficient ($C_p$) operational region for the at least one blade, wherein concurrently increasing the pitch angle of the at least one blade with an increase in TSR reduces a generator torque of the wind turbine, and
      increase the pitch angle of the at least one blade concurrently with a decrease in TSR so as to limit a power output of the wind turbine to a rated power for the wind turbine.

11. A system as in claim 10, wherein said sensor monitors TSR by monitoring the velocity of the tip of the at least one blade.

12. A system as in claim 10, wherein said sensor monitors TSR by monitoring wind speed.

13. A system as in claim 10, wherein said sensor monitors TSR by monitoring the rotational speed of the at least one blade.

14. A system as in claim 10, further comprising:

a gearbox coupled to said wind turbine, wherein said sensor monitors TSR by monitoring the rotational speed of a gearbox component.

\* \* \* \* \*